United States Patent [19]

Hoffman

[11] Patent Number: 4,602,860
[45] Date of Patent: Jul. 29, 1986

[54] CAMERA FOCUSING MEANS

[76] Inventor: Morris Hoffman, 19 Grand Ave., Farmingdale, N.Y. 11735

[21] Appl. No.: 686,448

[22] Filed: Feb. 6, 1985

[51] Int. Cl.⁴ .............................................. G03B 17/02
[52] U.S. Cl. ..................................... 354/160; 354/188
[58] Field of Search ............... 354/160, 189, 190, 191, 354/188; 355/40, 55

[56] References Cited

U.S. PATENT DOCUMENTS

| | | | |
|---|---|---|---|
| 762,164 | 6/1904 | Gundermann | 354/160 |
| 1,142,904 | 6/1915 | Morrell | 354/160 |
| 1,804,061 | 5/1931 | Roth | 354/160 |
| 2,310,850 | 2/1943 | Grover | 354/160 |
| 2,326,025 | 8/1943 | Gillon et al. | 354/160 |
| 2,619,014 | 11/1952 | Geddes | 354/160 |

*Primary Examiner*—L. T. Hix
*Assistant Examiner*—Brian W. Brown
*Attorney, Agent, or Firm*—James P. Malone

[57] ABSTRACT

In a camera of the flat bed type having a base, the camera being focused by looking at ground glass back viewing screen supported on a frame which is movable for focusing; means are provided to adjust the frame to simultaneously move the frame forward and backwards, sideways and rotatably for focusing the camera, and means are provided to lock the frame in position when the camera is focused. This invention combines four movements for the back of a folding type or flat bed camera. 1. A rising back, 2. shifting from side to side, 3. lateral swing and 4. tilting toward front or back. All these movements are achieved without using a center pivoting point. Doing it in a continuous working procedure, efficiently and with ease of movement with positive locking. The locking of the vertical movement clamping is accomplished on the sliding member and pivoting on the bottom axis. Means are provided for pivoting from either left or right side with its clamping means when camera is in focus.

3 Claims, 8 Drawing Figures

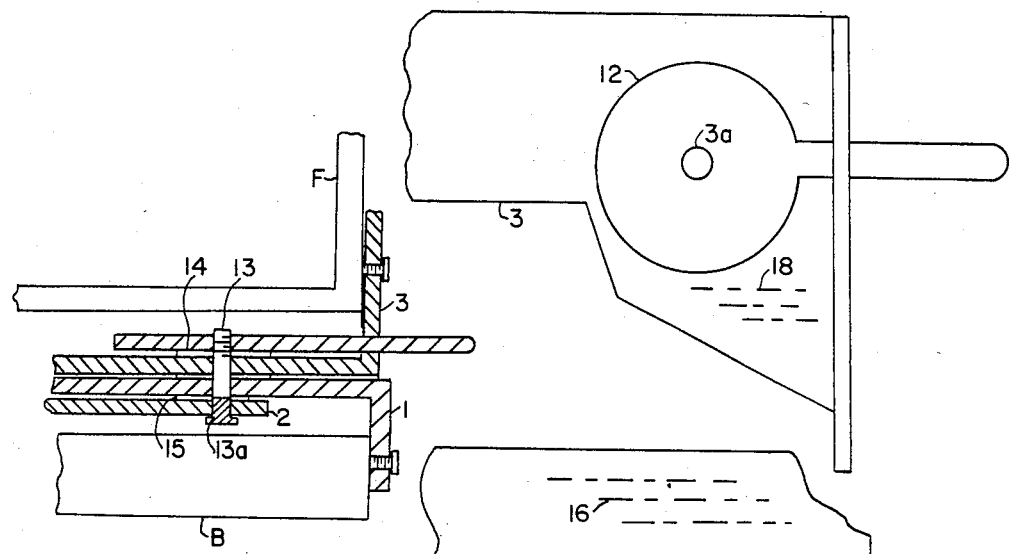
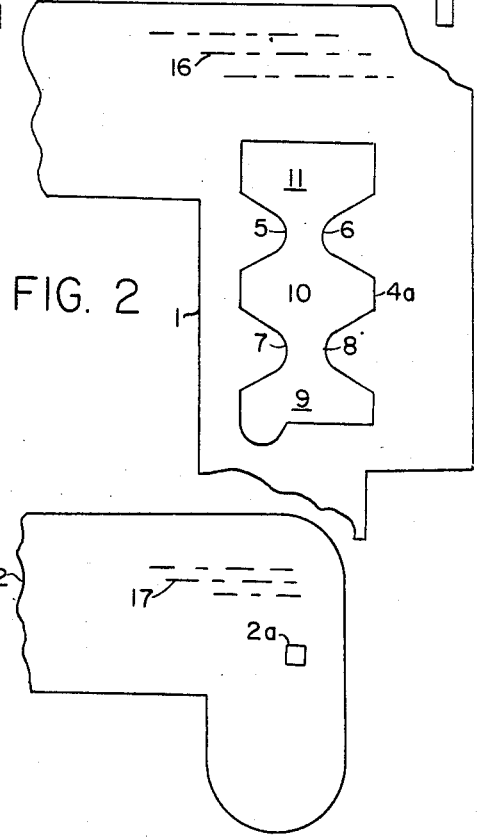
FIG. 7
FIG. 2

CAMERA FOCUSING MEANS

TECHNICAL FIELD

This invention relates to focusing means for a photographic camera of the folding or flat bed type used primarily for commercial, illustrative and locations photography, also called the field camera which folds up into a compact carryable unit.

BACKGROUND ART

In the past each movement for shifting from side to side partial rotations swing required separate movements with locking devices for each movement based on a center pivoting point.

In the prior art, these large format cameras using a ground glass viewing screen, most movements of the back in shifting, swing or tilts, there was always one or more center pivoting points. The center point pivoting method had a basic inefficient focusing procedure for correction of the image requiring constant refocusing. This was caused by the fact that when the camera back was moved on one side in one direction and the other side would move in the opposite direction by pivoting from a center point causing the fundamental problem of constantly requiring refocusing. The photographer first focuses on some subject matter that may be a scenic view and he has the foreground in focus and the background is out of focus and he now shifts the camera back, pivoting from the center point in order to get the background into focus, this now moves the camera away from the original position of focus to out of focus. This causes constant repositioning for a compromised best possible focus.

The prior art is illustrated by U.S. Pat. Nos.
2,310,850
2,326,025
2,619,014

None of these patents have the simultaneous locking adjusting means of the present invention for simultaneously adjusting the viewing frame forward, backwards, sideways and rotatably.

THE INVENTION

The feature of this invention embodies the latest state of the art of moving the camera back section containing the ground glass viewing area to do corrective photography.

This invention permits the camera back to be moved forward into different locations and swing in partial rotation and also shift from side to side through one working area on each side with positive locking devices.

This invention as shown by the drawings, has three metal plates secured by the means of the locking devices. The movement achieves a very smooth and ease of movement in all directions. Through a series of cut outs or indents, the locking screw fitting assembly is able to position itself in various locations and locked firmly. The nature of these indents or cut outs permits the locking assembly to move therein to be supported so it can travess without jamming.

This invention provides for the proper method of operation of the camera back to achieve focus quickly and correctly. The camera back is brought into focus for the main subject matter and then locking or holding that position and then just tilting or swinging that portion of the camera back which is out of focus into focus, then the camera is ready for photographing.

In this invention, Applicant has achieved a smoothness and efficiency of operation. To eliminate all possible friction in the moving area of contact of metal to metal, nylon shims and teflon coating are used. This permits the absolute smoothness of operation without going to the added cost of specialized metal bearing surfaces.

OBJECTS OF THE INVENTION

Accordingly, a principal object of the invention is to provide a new and improved focusing means for a camera which is focused by looking at a ground glass viewing screen and moving the camera back to focus the camera.

Another object of the invention is to provide a new and improved focusing means for a camera which is focused by looking at a ground glass viewing screen and by moving the camera back to focus therefore simultaneoulsy adjusting the ground glass back section frame forward, backwards and sideways and rotatably.

Another object of the invention is to provide a new and improved camera of the folding or flat bed type having a base, the camera being focused by looking at a ground glass back viewing screen supported on a frame which is movable for focusing, means to adjust the frame to simultaneously move the frame forward, backwards, sideways and rotatably for focusing the camera.

Another object of the invention is to provide new and improved camer of the folding or flat bed type having a base, the camera being focused by looking at a ground glass back viewing screen supported on a frame which is movable for focusing, means to adjust the frame to simultaneously move the frame forward, backwards, sideways and rotatably for focusing the camera, having means to lock the frame in position when the camera is focused.

Another object is to provide a new and improved camera which combines four movements for the back of a folding type or flat bed camera. A rising back shifting from side to side, lateral swing and tilting toward front or back. All these movements are achieved without using a center pivoting point.

These and other objects of the invention will be apparent from the following specifications and drawings of which:

BRIEF DESCRIPTION OF THE DRAWINGS

FIG. 2 is an exploded detail view of the embodiment of the invention.

FIG. 7 is a side detail view of an embodiment of the invention.

BEST MODE OF THE INVENTION

Figure 1:
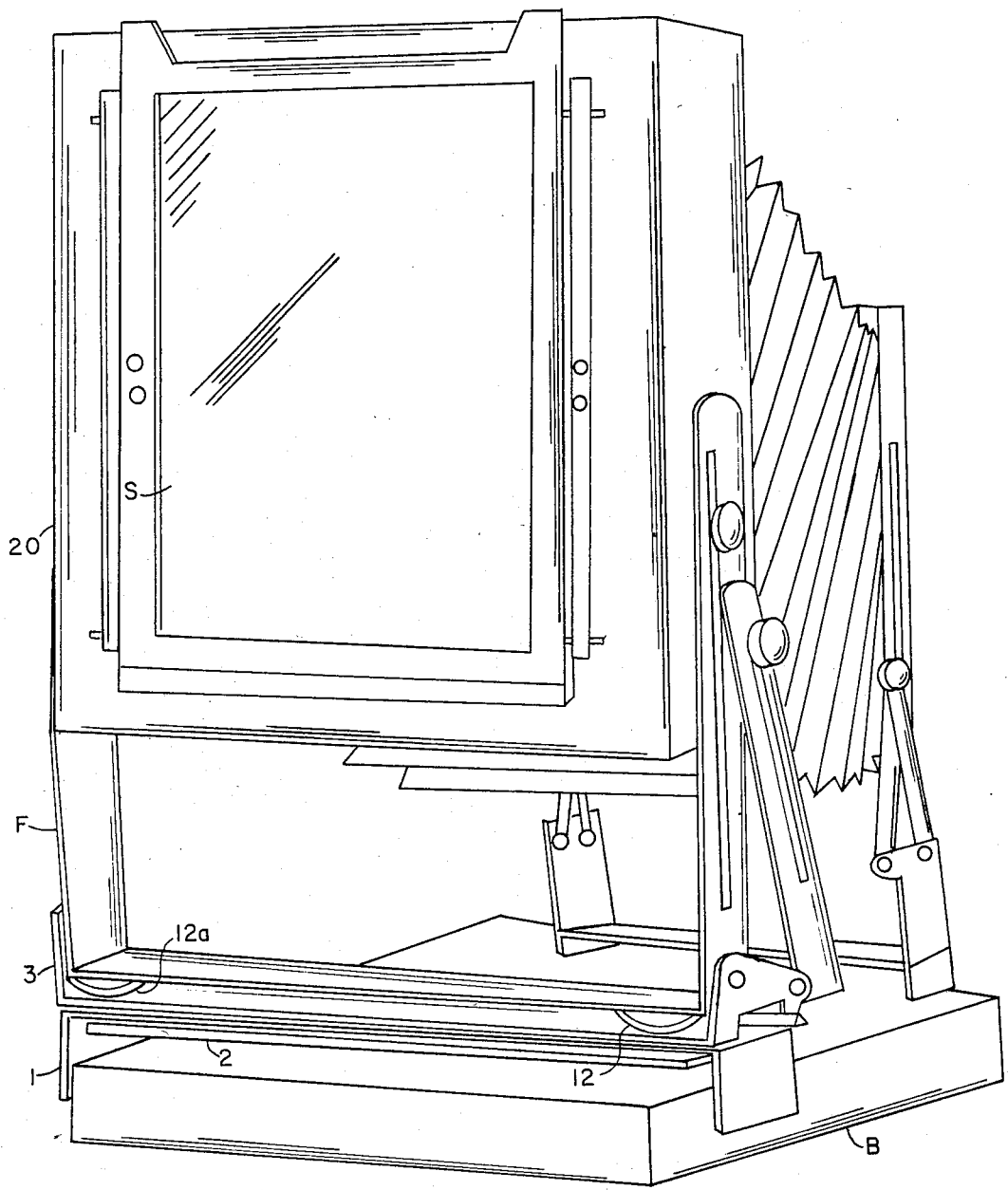
FIG. 1 is a perspective view of an embodiment of the invention.

Referring to FIG. 1, the invention is a locking adjustable mounting for the frame member F on the camera C. Mounted on the frame is a ground glass viewing screen S which is mounted on the frame in conventional manner preferably so that it can be tilted with respect to the frame F. The camera is focused by moving the frame F, forward and backwards, sideways and rotatably with respect to the base B. This is accomplished by the elongated members 1, 2 and 3, as will be explained.

Figure 4:
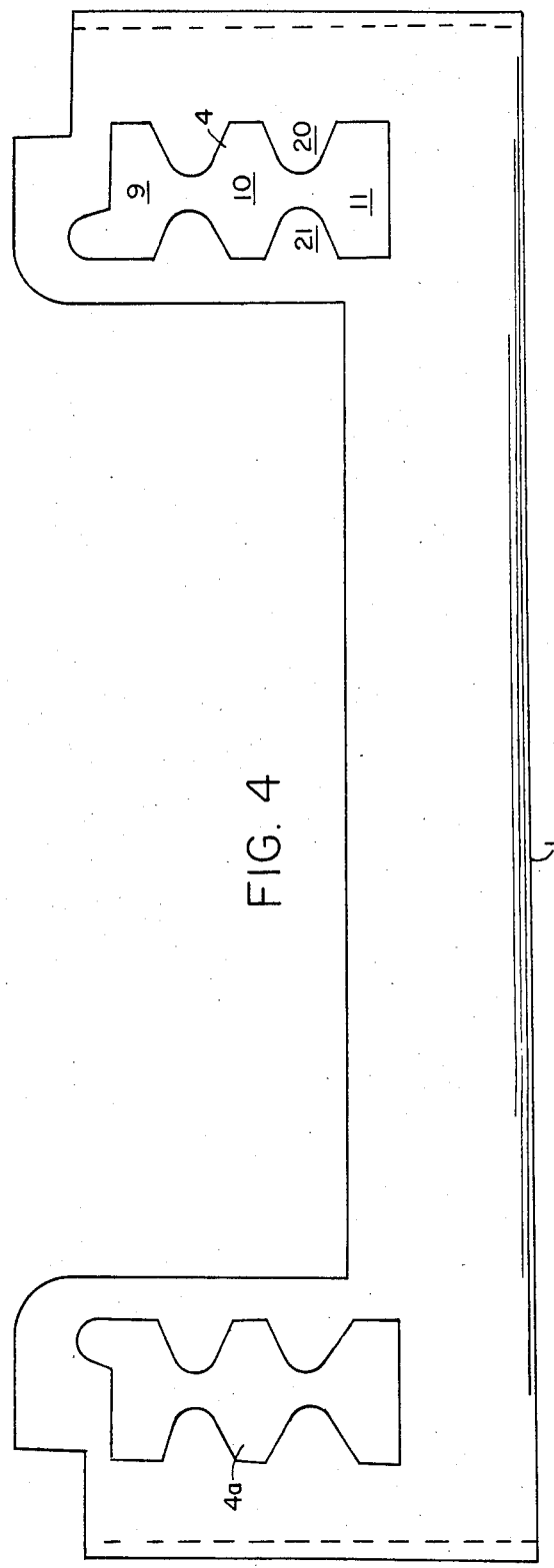
FIG. 4 is a detail view of the indented elongated member attached to the frame.

FIG. 2 shows an exploded view of the adjusting and locking mechanism of the invention. The first member 1, which is shown in detail in FIG. 4, is fixedly mounted on the base B and has an indented aperture 4, which extends parallel to the sighting axis of the camera. The aperture 4 has indentations 5, 6, 7, 8 which form expanded areas 9, 10, 11.

The member 2 is movably mounted under the member 1 and has an aperture 2a, which is shown as square for the purpose of preventing rotation of the locking screw, which will be described.

The third elongated member 3 is mounted above the member 1 and has an aperture 3a to receive a locking screw, to be described. A locking nut 12 is mounted on top of the member 3 and is threaded on to locking screw 13. The locking screw 13 has a square triangular or keyed portion 13a which prevents it from rotating with respect to the member 2. The screw extends through aperture 2a, aperture 4, in the member 1 and aperture 3a in the member 3 and the locking nut is threaded on upper end of the member 13. Therefore, the screw connects the members 2 and 3 into an assembly which is movable with respect to the fixed member 1.

FIG. 2 shows only one end of the members 1, 2 and 3 and the other ends are identical. The frame F for the viewing plate is mounted on the member 3. Shims 14, 15, are preferably inserted between the members 1 and 3 and 1 and 2, respectively. Also, the rubbing contact surfaces of the members 1, 2 and 3, preferably have teflon coatings, 16, 17 and 18.

In operation, the camera is focused by the user placing both hands on the left and right sides of the frame F and looking at the viewing screen and moving the frame either forward, backwards, sideways or rotatably, until the picture is in focus. At this point, the locking nuts are tightened locking the frame in position. Please note that all of the adjustments can be done simultaneously which is a substantial improvement over the prior art, where the adjustments are generally made separately, which is a tedious process since one adjustment may affect the other ones.

Figure 3:
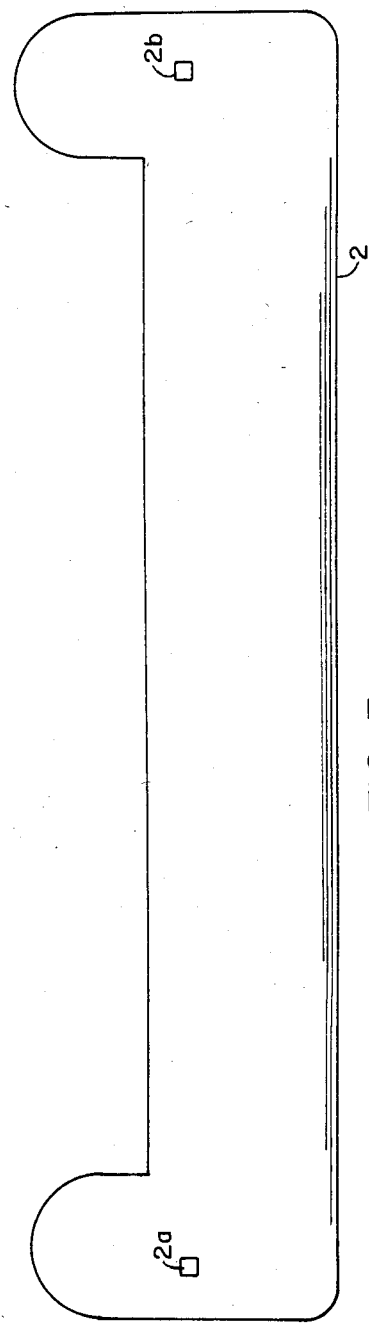
FIG. 3 is a detail view of the lower elongated member.

FIG. 3 is a detail view of the member 2 showing the apertures 2a and 2b.

FIG. 4 is a detail view of the member 1 showing the apertures 4, 4a. The expanded areas 9, 10, 11 permit movement of the locking screw forward and backward, sideways and rotatably, in a simultaneous fashion. The purpose of the indentations is to provide the expanded areas and still maintain enough surface locking areas 20, 21, etc., so that a good locking of the members can be achieved.

Figure 5:
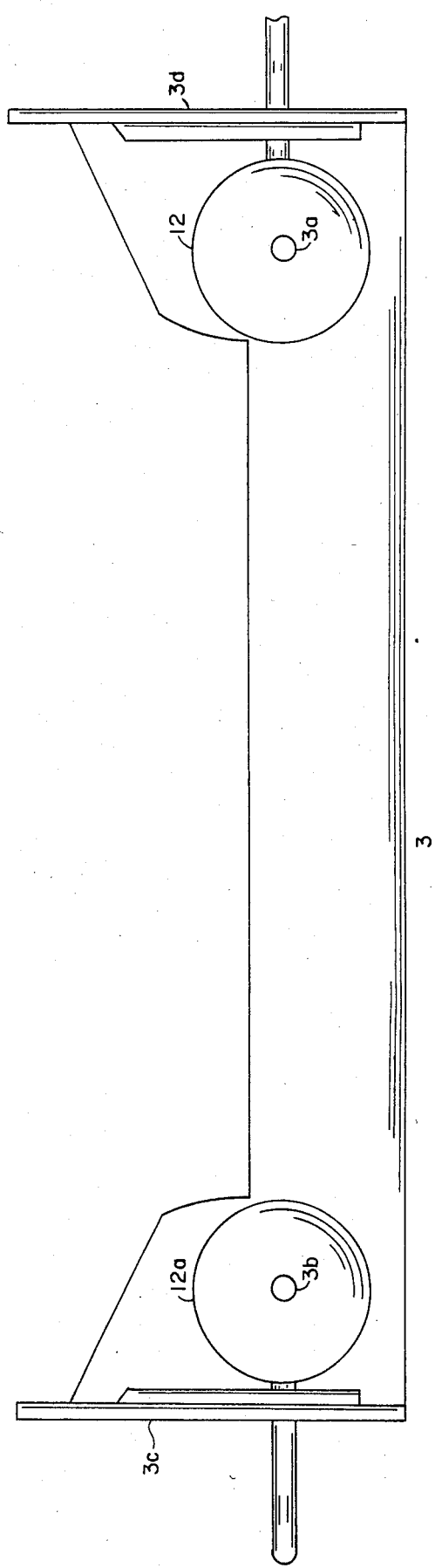
FIG. 5 is a detail view of the upper elongated member with locking nuts.

FIG. 5 is a detail view of the member 3 showing the apertures 3a, 3b and the locking nuts 12, 12a which preferably have extending arms 12b, 12c, which can be gripped by the fingers of the user for locking the locking member.

Figure 6:
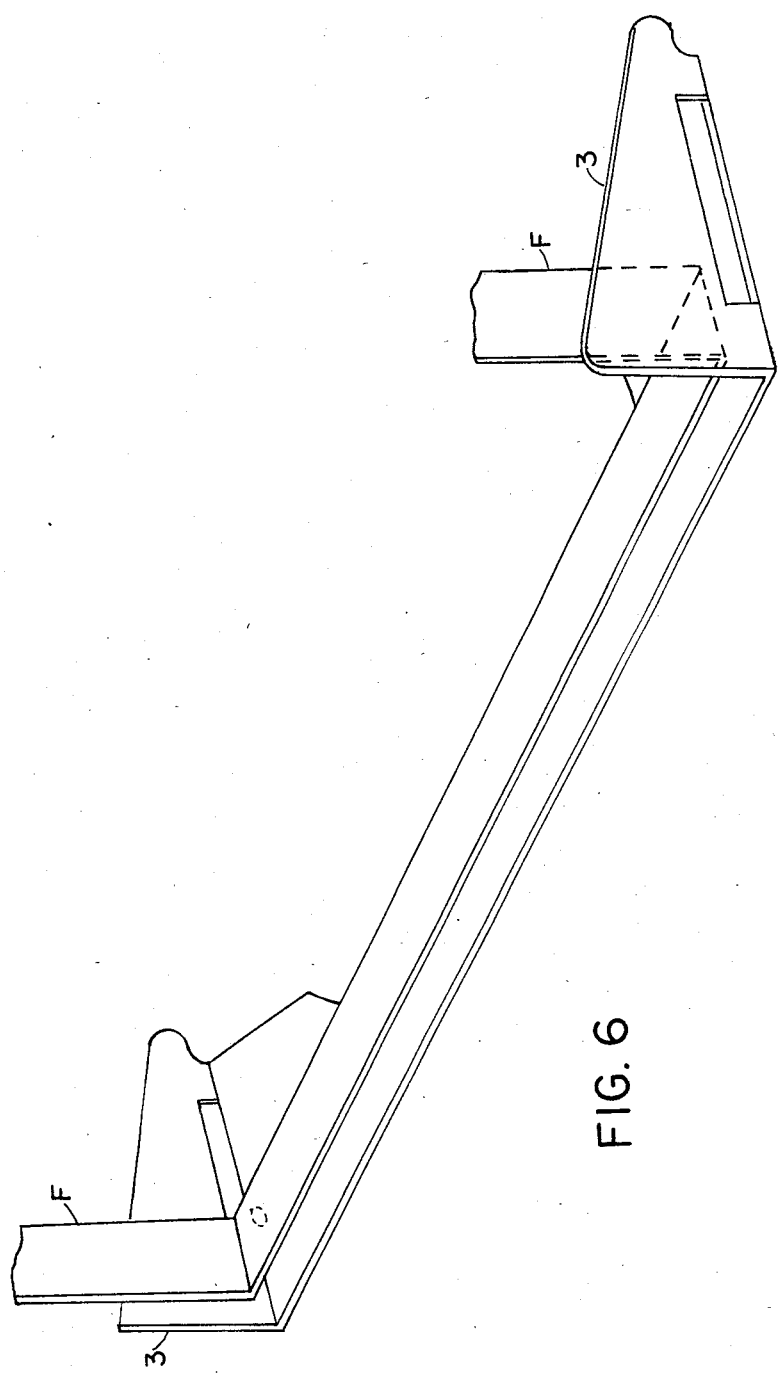
FIG. 6 is a perspective view of the upper elongated member mounting the frame.

Referring to FIG. 6, the arms extend through the apertures 20, 21. The frame F is mounted on the upwardly extending side portion 3c, 3d of the member 3. The ground glass viewing screen S is mounted on the frame F in conventional manner.

FIG. 7 shows a side view of the assembly of the members 1, 2, 3. The member 1 is mounted on the base B and the frame F is mounted on the member 3 in conventional manner. The other ends of the members have a similar connection.

Figure 8:
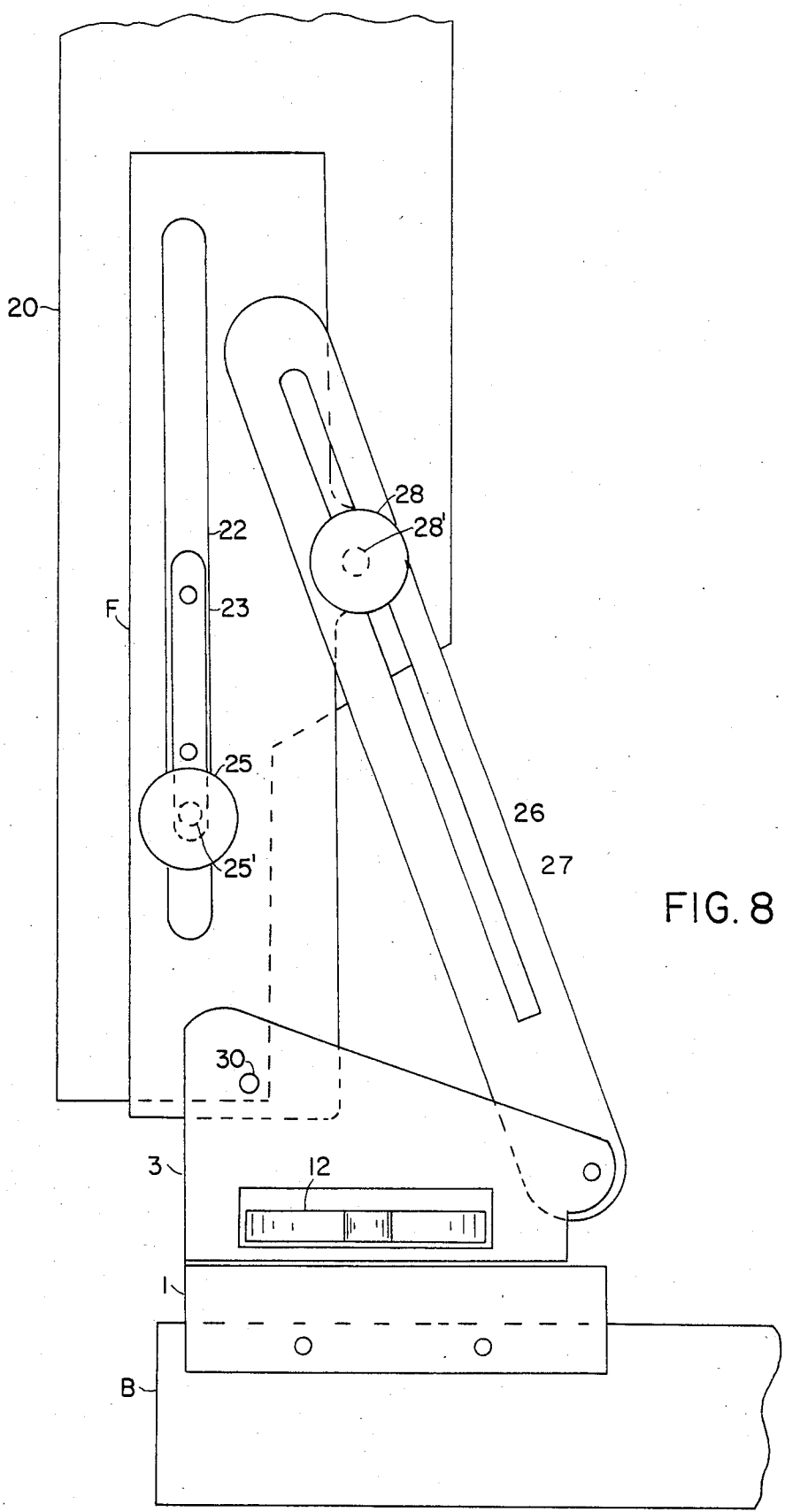
FIG. 8 is a side view of back screen tilting and raising means.

FIG. 8 shows a side view of the back screen raising and tilting means with locking means. The viewing screen S, FIG. 1, is mounted in a box member 20. A first elongated support frame member 21 is pivotally mounted on the rear of removable frame 3 and has a first slot 22. A slide member 23 is mounted on the box 20 and slides in the slot 22. A first screw is mounted in the box and a locking knob 25 is threadedly mounted on the screw 25' so that the box can be locked in position with respect to the member F.

A second elongated member 26 is pivotally mounted on the movable frame 3 at its forward end. The second elongated member has a slot 27. A second screw is mounted in the box 20 and extends through the slot 27 and a second locking knob 28 is threadedly mounted on the screw 28' so that the box can be locked with respect to the member 26.

Therefore, by releasing the locking knobs, the box 20 can be rotated around the pivot 30 for tilting. After the tilt has been adjusted, the box is locked in position by means of the locking knobs 25 and 28. There are corresponding tilting, raising and locking mechanisms on the other side of the box.

This invention combines four movements for the back of a folding type or flat bed camera. 1. A rising back, 2. shifting from side to side, 3. lateral swing and 4. tilting toward front or back. All these movements are achieved without using a center pivoting point. Doing it in a continuous working procedure, efficiently and with ease of movement with positive locking.

The feature of the rising back for a folding type or flat bed camera is that it closes up into a box so it can be carried. This requires a special U shaped frame F so constructed that it is fitted flush with the camera back housing 20, so it can rise and fall and lock into a fixed place as desired. This smoothness of movement is achieved with the use of nylon shim and teflon coating. This frame for the rising and lowering is so made that the locking knobs do not interfere with the movement of the sliding tilting arm 26. Therein this invention achieves the efficiency of tilting from single end pivoting point making possible complete control of all movements from the back of the camera.

The rising back permits the repositioning of an image to fit into the ground glass viewing screen S and to also correct for unnecessary reflections. Just by raising or lowering the camera back the reflections are eliminated.

The camera may be folded into a compact package with the lens in place, for excellent portability and has great ease of operation. This type camera is generically called a field camera. The rising feature is useful in eliminating unwanted reflections.

This invention combines all operations into one locking adjustment. The combined features and simplicity of the device we have achieved a forward, backwards shift, a side shifting and a partial rotation swing and a rising and tilting viewing screen.

I claim:

1. In a camera of the folding or flat bed type having a base, a moveable frame, a box member, and the camera being focused by looking at ground glass viewing screen supported on the frame which is moveable for focusing, the viewing screen being mounted in the box member:

means mounted on the moveable frame for raising and means mounted on the base for tilting the said viewing screen, the tilting means being pivoted on the base, at the bottom of the frame, the tilting and raising means being separate and independent, whereby when the viewing screen is raised, the amount of tilt of the viewing screen remains constant, and means to lock the viewing screen in position after focusing.

2. Apparatus as in claim 1 wherein the means for raising and the means for tilting comprises:

a first elongated support member pivotally mounted on the rear of the movable frame, a first slot in the first support member, a slide member mounted on the box member and sliding in the first slot, a first screw mounted on the box and extending through the first slot and a first locking knob threadedly mounted on the first screw, a second elongated support member pivotally mounted on the front of the movable frame, a second slot in the second support member, a second screw mounted in the box member and extending through the second slot and a second locking knob threadedly mounted on the second screw whereby the camera back may be raised vertically with or without tilting.

3. In a camera of the flat bed type having a base, the camera being focused by looking at a ground glass back viewing screen in a box member supported on a frame having side sections which is movable for focusing:

slideable linkage means connected to the frame to adjust the frame to simultaneously move the frame forward and backward, sideways and rotatably for focusing the camera, and means for raising and tilting said viewing screen comprising a member fixedly mounted on the base, a first slotted member pivoted on said fixedly mounted member for raising the screen, a second slotted member pivoted on said fixedly mounted member for tilting the screen, and means connected to the frame to lock the viewing screen and frame in position after focusing.

* * * * *

REEXAMINATION CERTIFICATE (2288th)
United States Patent [19]
Hoffman

[11] B1 4,602,860
[45] Certificate Issued  May 3, 1994

[54] CAMERA FOCUSING MEANS

[76] Inventor: Morris Hoffman, 19 Grand Ave., Farmingdale, N.Y. 11735

Reexamination Request:
No. 90/002,731, May 22, 1992

Reexamination Certificate for:
Patent No.: 4,602,860
Issued: Jul. 29, 1986
Appl. No.: 686,448
Filed: Feb. 6, 1985

[51] Int. Cl.⁵ ............................................. G03B 17/02
[52] U.S. Cl. ................................... 354/160; 354/188
[58] Field of Search ............................. 354/160, 188

[56] References Cited
FOREIGN PATENT DOCUMENTS
11746  2/1909  United Kingdom.

OTHER PUBLICATIONS
"Darkroom Techniques" magazine, Nov./Dec. 1983, vol. 4, No. 6, p. 39.

*Primary Examiner*—Howard B. Blankenship

[57] ABSTRACT

In a camera of the flat bed type having a base, the camera being focused by looking at ground glass back viewing screen supported on a frame which is movable for focusing; means are provided to adjust the frame to simultaneously move the frame forward and backwards, sideways and rotatably for focusing the camera, and means are provided to lock the frame in position when the camera is focused. This invention combines four movements for the back of a folding type or flat bed camera. 1. A rising back, 2. shifting from side to side, 3. lateral swing and 4. tilting toward front or back. All these movements are achieved without using a center pivoting point. Doing it in a continuous working procedure, efficiently and with ease of movement with positive locking. The locking of the vertical movement clamping is accomplished on the sliding member and pivoting on the bottom axis. Means are provided for pivoting from either left or right side with its clamping means when camera is in focus.

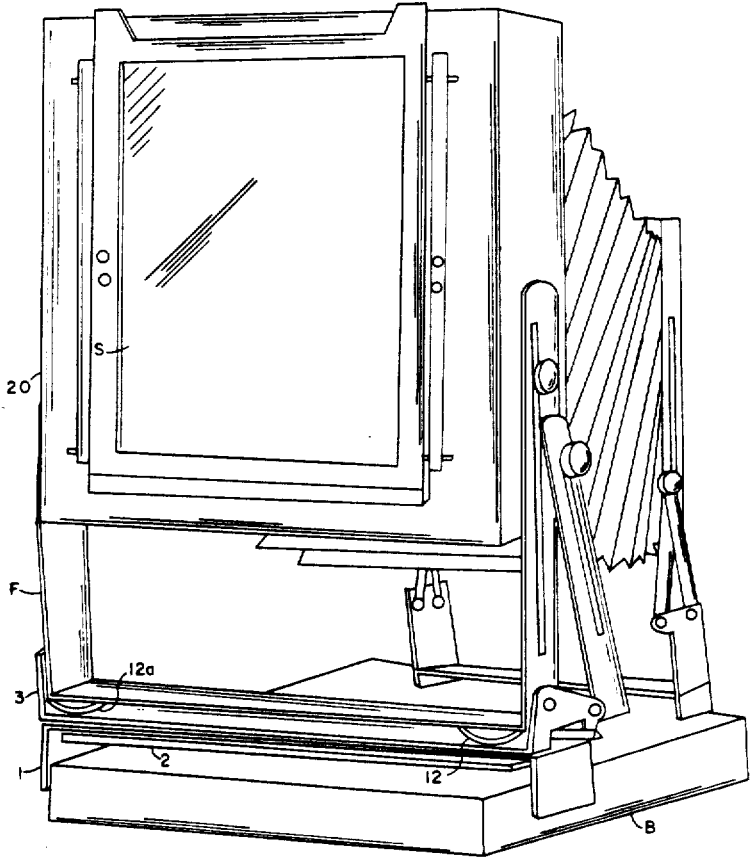

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-3 are determined to be patentable as amended.

New claims 4-7 are added and determined to be patentable.

1. In a camera of the folding or flat bed type having a base, a moveable frame, a box member *located in said frame, a ground glass viewing screen supported in said box member*, [and] the camera being focused by looking at the ground glass viewing screen [supported on the frame] which is *selectively* moveable for focusing, [the viewing screen being mounted in the box member]:
    means mounted on the moveable frame for raising and *lowering the viewing screen while simultaneously constraining the pivoting of said viewing screen relative to the frame and* means mounted on the base for tilting [the] *said* viewing screen[,] *and* the tilting means being pivoted on the base, *having a fixed pivot axis at the bottom of the frame extending trasnversely of said base*, the tilting and raising means being separate and independent, whereby when the viewing screen is raised, the amount of tilt of the viewing screen remains constant, *and when the viewing screen is tilted the height of the viewing screen is unaffected,* and means to lock the viewing screen in position after focusing.

2. Apparatus as in claim 1 wherein the means for raising and the means for tilting comprises:
    [a] first elongated support [member] *members* pivotally mounted on the rear of the moveable frame *and between which the box member is located,*
    a first slot in *each of* the first support [member] *members,*
    [a] slide [member] *members* mounted on the box member and sliding *respectively* in *each of* the first [slot] *slots,*
    [a] first [screw] *screws* mounted on the box and extending through *each of* the first [slot] *slots* and a first locking knob threadedly mounted on *each of* on the first [screw] *screws to adjustably secure said box member,*
    [a] second elongated support [member] *members* pivotally mounted [on] *at one end to said base at the front of the movable frame,*
    a second slot in *each of* the second support [member] *members,*
    [a] second [screw] *screws* mounted in the box member and extending through *each of* the second [slot] *slots* and [a] second locking [knob] *knobs* threadedly mounted on *each of* the second [screw] *screws* whereby the camera back may be raised vertically with or without tilting.

3. In a camera of the flat bed type having a base, the camera being focused by looking at a ground glass back viewing screen in a box member supported on a frame having side sections which is movable for focusing comprising:
    [slideable] *slidable* linkage means [connected to] *connecting* the frame *to the base* to adjust the frame to simultaneously move the frame forward and backward, sideways and rotatably for focusing the camera, and means for raising and tilting said viewing screen comprising a member fixedly mounted on the base, a first slotted member pivoted on said fixedly mounted member, *to swing about a fixed axis extending transversely of said base and means extending through said first slotted member* for raising the screen *while preventing pivoting movement of said viewing screen relative to said fixedly mounted member,*
    a second slotted member pivoted on said fixedly mounted member for *stabilizing the viewing screen upon* tilting [the] *said* screen,
    and means connected to the frame to lock the viewing screen and frame in position after focusing.

*4. In the camera according to claim 1 the improvement wherein said frame is formed having a pair of arms between which said box is located, each of the arms of said frame having an elongated slot, each of the sides of said box having a slide member extending into the slot of the corresponding arm of said frame so that said box may be raised and lowered without pivoting of said box relative to said arms and said means to lock comprises means cooperating with at least one of said arms for removably securing said box in position with said frame.*

*5. In the camera according to claim 4 wherein said means for securing said box comprises a screw extending from at least one of said slide members through the associated slot and having a threaded knob adapted to engage said at least one arm.*

*6. In the camera according to claim 5 wherein said tilting means comprises a pair of elongated brackets located respectively on each side of said frame, each of said brackets being mounted at one end to said base to pivot about a pivot axis remote from and parallel to the fixed pivot axis of said frame, and including means for securing each of said brackets at its other end to an associated arm of the frame to stabilize said frame at a selected angular position.*

*7. In the camera according to claim 6 wherein each of the brackets for stabilizing the frame are provided with an elongated slot, and a screw extending through said slot threadedly engaging with the associated arm of said frame to removably secure each of said brackets to its associated arm.*

* * * * *